May 9, 1939.  J. PINTER, SR., ET AL  2,157,186
CONVERTIBLE TRAILER-BOAT
Filed Jan. 17, 1938
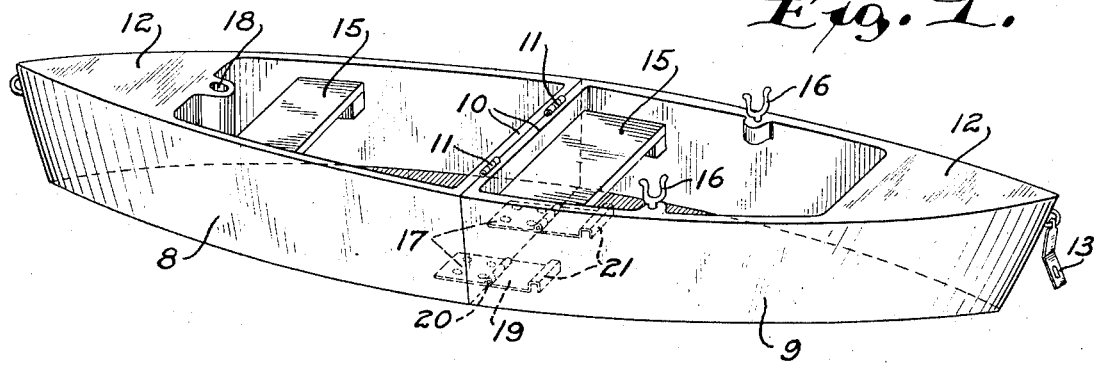
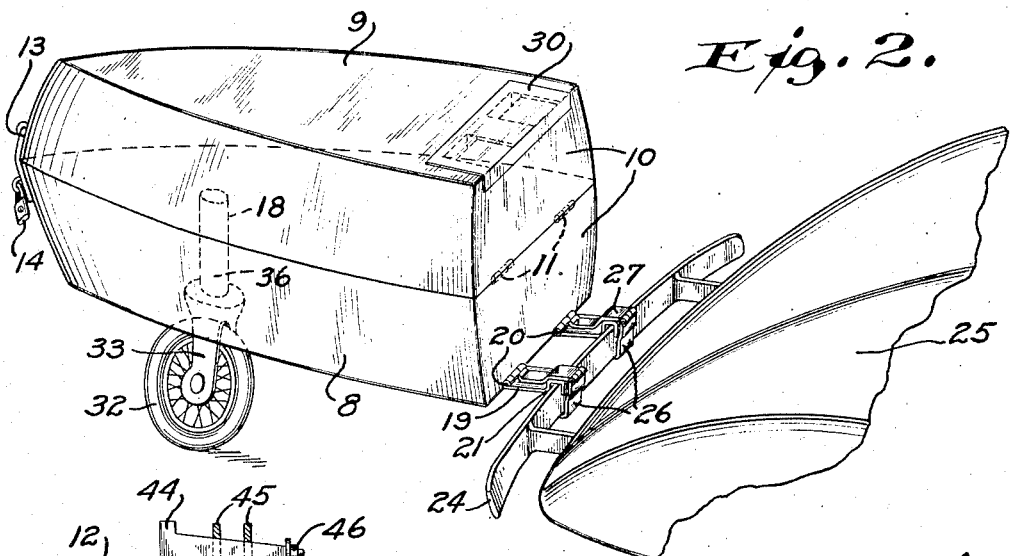
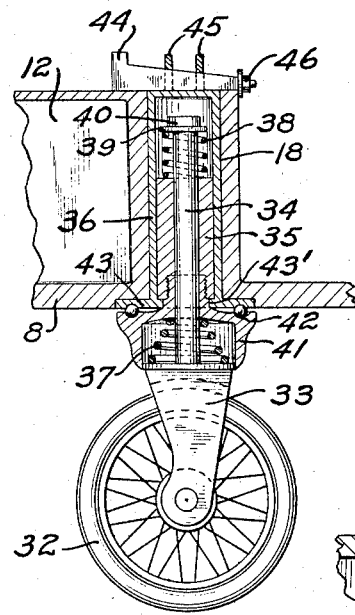
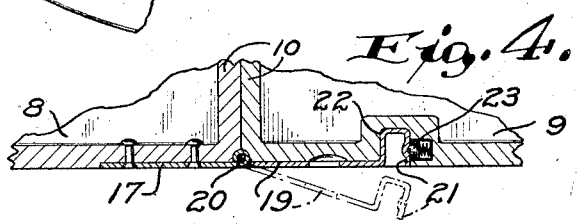
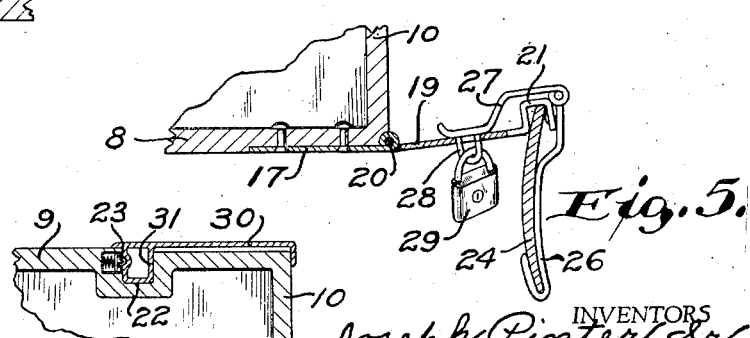
INVENTORS
Joseph Pinter, Sr.
Joseph Pinter, Jr.
BY Morsell, Lieber & Morsell
ATTORNEYS.

Patented May 9, 1939

2,157,186

UNITED STATES PATENT OFFICE 2,157,186

CONVERTIBLE TRAILER-BOAT

Joseph Pinter, Sr., and Joseph Pinter, Jr., Milwaukee, Wis.

Application January 17, 1938, Serial No. 185,299

5 Claims. (Cl. 9—2)

Our invention relates in general to improvements in the construction of boats which may be converted into trailers or the like for the storage and transportation of equipment, or reconverted into boat form, at will.

Generally defined, an object of our invention is to provide a new and useful convertible trailer-boat or boat-trailer assemblage, which is extremely durable and compact in construction, and which may be quickly and conveniently converted from one form to the other.

It has heretofore been proposed to construct a boat with relatively foldable end sections for converting the boat into a trailer storage compartment for camping equipment or the like, but in these prior assemblages it was customary to provide a special trailer carriage for supporting the folded boat structure during transportation thereof by the draft vehicle. These prior assemblages were not only complicated and relatively expensive to manufacture and maintain, by virtue of the use of such special carriages; but the carriage was also objectionable because it either had to be dragged along with the automobile or draft vehicle even if the boat was not mounted thereon, or be disconnected from the vehicle and left lying in unprotected and unsafe places. For example, if the owner of one of these prior assemblages had launched the boat in a lake which was relatively free from habitations but quite readily accessible from the highways, and desired to leave the boat hidden in the rushes while he took a trip with his automobile to some other locality, it was necessary with the previous assemblages, for him to either unhitch the trailer carriage and to leave it lying where it might be stolen or tampered with, or to drag the empty trailer along and thus subject the same to unnecessary wear and tear. The previous convertible carriage assemblages were furthermore objectionable because they utilized complicated hitches or couplings which would permit the carriages to swing sidewise, and thus introduced additional complications.

It is therefore a more specific object of our present invention to provide an improved convertible assemblage of the above described type, wherein the use of a special and complicated carriage is obviated, and in which the folded boat structure is supported during transportation thereof with the vehicle, by means of a carrying wheel coacting directly with the boat and which may be conveniently removed and placed within the automobile trunk or other storage space when the boat is not present.

Another specific object of our invention is the provision of a boat-trailer assembly in which the parts which are used to hold the boat sections in open or distended position as a boat, are also utilized to connect the folded sections to the draft vehicle when the attachment is being used as a trailer, so that when the trailer is converted into a boat the trailer parts are relatively few and compact and are simultaneously completely removed from the automobile.

A further specific object of this invention is to provide a convertible boat and trailer which may be easily converted from a boat into a trailer and vice versa, and which is safe for either use and may be manufactured and sold at moderate cost.

Still another specific object of the invention is the provision of a trailer-boat assemblage, which when used as a trailer will conform to and augment the streamlined appearance of the modern automobile to which it may be attached, and when utilized as a boat produces a substantial and well shaped structure which can be readily propelled through the water.

These and other objects and advantages of the invention will be apparent from the following detailed description.

A clear conception of an embodiment of the invention, and of the mode of constructing and of utilizing convertible assemblages built in accordance with the improvement, may be had by referring to the drawing accompanying and forming a part of this specification in which like reference characters designate the same or similar parts in the various views.

Fig. 1 is a perspective view of the assemblage converted into a boat;

Fig. 2 is another perspective view of the same assemblage converted into a trailer and attached to the rear bumper of an automobile;

Fig. 3 is an enlarged central vertical section through a caster support for the trailer compartment, also showing a fragment of the latter;

Fig. 4 is a similarly enlarged fragmentary longitudinal vertical section through the central portion of the boat;

Fig. 5 is a likewise enlarged fragmentary section showing the hitch for attaching the trailer to a bumper; and Fig. 6 is a similarly fragmentary section through the upper front corner portion of the trailer compartment.

While our invention has been shown herein as being embodied in a specific type of row boat supported by a single caster wheel when converted into a trailer, and utilizing common connecting means for holding the boat open and for attaching the same to a vehicle, it is not intended to thereby unnecessarily restrict the scope.

Referring to the drawing, the improved assemblage comprises in general a bottom or one end section 8 and a top or opposite end section 9, each having a transverse partition 10 swingably connected at its free edge to the other partition, by means of hinges 11 so that the structure may either be folded open as shown in Fig. 1 to form a boat, or closed as illustrated in Fig. 2 to provide a trailer compartment. Each of the sections 8, 9 may be provided at its sharpened or tapered end, with an air chamber 12 in order to increase the buoyancy of the boat, and these ends of the sections 8, 9 may also be provided with a releasable latch 13 and a padlock 14 for locking the trailer compartment in closed condition as indicated in Fig. 2. The sections 8, 9 may also be provided with removable seats 15 and with detachable oar locks 16 as shown in Fig. 1, and are adapted to be fastened to each other in distended or open position by means of one or more latch plates 17 so as to complete the boat structure. The bottom section 8 is additionally provided near the air chamber 12 thereof, with a cylindrical bore 18 forming a downwardly open well extending upwardly therethrough, but so formed that it will not permit water to enter the boat from beneath.

The specific construction of the latch plates 17 for holding the boat sections in open position or in longitudinal alinement, is shown in Fig. 4, and it will be apparent that each latch plate 17 comprises a part permanently secured to the bottom section 8, and a latch portion 19 swingably attached to the rigid part by means of a pivot pin 20. The swingable portion 19 has a U-shaped end 21 which is formed to snugly engage an adjacent recess 22 in the bottom of the boat section 9 when the latter is swung downwardly, and the U-shaped ends 21 are adapted to be locked within their receiving recesses 22 by means of spring pressed ball retainers 23 as clearly indicated in Fig. 4. The sections 8, 9 will thus be firmly held in longitudinal alinement when the ends 21 of the latch portion 19 are snapped within the recesses 22, and the retaining effect is augmented by pressure applied from above to the open boat assemblage.

It will also be noted, that the U-shaped ends 21 of the swinging latch portions 19 provide simple but effective means for conveniently attaching the trailer compartment to any style of rear bumper 24 of an automobile or other draft vehicle 25, as illustrated in Fig. 5. In order to effect such attachment, it is only necessary to hook the U-shaped ends 21 over the top of the bumper 24, and to apply to each end 21 and to the adjacent bumper portion, a hinged clamp formed of lower and upper parts 26, 27 respectively. The lower part 26 of each clamp is adapted to hook beneath the bumper 24, and the upper swingable part 27 is formed to coact with the adjacent U-shaped end 21 and has a staple 28 formed to pass through a slot in the latch portion 19 and to which another padlock 29 may be applied as shown. When the parts are thus assembled, the latch portions 19 will be firmly but detachably attached to the bumper 24, and the hinge pins 20 will permit the trailer compartment to swing vertically relative to the bumper but not horizontally.

When the trailer assembly is in use, it may be desirable to conceal the recesses 22 which are then exposed toward the top of the compartment, and this may be done by providing a removable cover plate 30 as shown in Figs. 2 and 6. This cover plate 30 may be of angular formation so as to protect the upper front corner of the section 9, and has integral projections 31 formed to snap into the recesses 22 and to be locked therein by the ball retainers 23. The plate 30 will thus be held firmly in place, but may be quickly removed by prying the lugs or projections 31 out of the recesses 22 with an implement such as a screw driver.

In order to convert the boat into a trailer, it is necessary in addition to attaching the bottom section 8 to the bumper 24, to provide some means for supporting the trailer compartment for transportation, and this supporting means is clearly illustrated in Figs. 2 and 3. The removable trailer support comprises a caster wheel assemblage which is adapted to be pivotally mounted directly in the vertical bore 18 of the lower section 8. The caster wheel 32 is rotatably mounted in a fork 33 having a pivot stem 34 slidable and rotatable within a sleeve 35 which is journalled in a tubular casing 36. A helical spiral compression spring 37 is interposed between the top of the fork 33 and the lower end of the sleeve 35, and surrounds the stem 34; and a helical compression spring 38 is located between the top of the sleeve 35 and a washer 39 secured to the top of the stem 34 by means of a nut 40. This spring assemblage provides a resilient cushion between the wheel 32 and the pivot sleeve 35, acting in both directions.

The sleeve 35 has a lower ball race 41 secured thereto and coacting through ball bearings 42 with an upper race 43 which is formed integral with the tubular casing 36, and has an internal flange 43' for holding the sleeve 35 and the race 41 in place. The casing 36 is adapted to be locked within the bore 18 by means of a wedge 44 passing through ears 45 formed integral with the casing 36, see Fig. 3. The wedge 44 also coacts with the top surface of the section 8 and may be detachably held in place by means of a nut 46 coacting with the threaded wedge end. Upon removal of the nut 46 and wedge 44, the casing 36 may obviously be freely removed from within the bore 18, thus completely releasing the caster wheel assemblage from the section 8, and it should also be noted that the bottom of the boat is entirely devoid of projections which might otherwise interfere with launching thereof.

While the normal mode of utilizing the assemblage either as a boat or as a trailer, will be clearly apparent from the foregoing description, we will again present a short résumé of these uses. When the assemblage is to be used as a boat, the hingedly connected sections 8, 9 are swung to the position shown in Fig. 1 after the caster wheel has been removed, and with the seats 15 and oar locks 16 applied, the boat is ready for use. The air chambers 12 will then serve to enhance the buoyancy of the boat, and the latch plates 17 will effectively retain the boat in assembled condition. If the boat is to be converted into a trailer assembly, it is only necessary to fold the section 9 over the section 8 after the caster wheel has been applied to the bore 18 and locked in place by application of the wedge 44 and nut 46. The U-shaped ends 21 of the latch plate portions 19 may then be hooked over the bumper 24 and secured thereto by application of the clamps and locks 29, and the cover plate 30 and lock 14 may be finally applied to complete and to seal the trailer assembly. The vehicle 25 may then be transported over the ground, and the hinging action afforded by the pivot pins 20 cooperating with the springs 37, 38 will permit the trailer compartment to ride over uneven ground without excessive shock and without subjecting the bumper 24 to undesirable stress. The conversion of the trailer into a boat may be just as readily effected; and the few parts including the caster wheel assembly, clamps, and plate 30 which are removed during such conversion may obviously be readily stored within the vehicle 25.

From the foregoing detailed description, it will be apparent that our present invention provides an improved convertible boat and trailer assemblage which is extremely simple, compact, and safe, and which can be quickly converted either from a boat into a trailer or from a trailer into a boat, with minimum effort. When the assemblage is converted into a boat, the accessories which are utilized to convert the same into a trailer, may be conveniently stored within the draft vehicle and do not remain in trailing position. The caster wheel assemblage, the clamps, and the cover plate 30 constitute the parts for effecting such conversion, and obviously these parts occupy relatively small space and may therefore be conveniently stored within the vehicle. The conversion of the assemblage from one form into the other may moreover be made by a novice, and the construction of the boat is obviously such that the sections will be firmly retained in longitudinal alinement when the U-shaped ends 21 of the latch portions 19 are snapped within the recesses 22. The assemblage moreover presents an extremely neat appearance, and the hinging action afforded by the pivots 20, cooperating with the compound spring action provided for in the caster wheel, will insure smooth running of the trailer. It is also noteworthy that the improved assemblage when used as a trailer is adapted to be readily attached to various types of standard bumpers of automobiles, and that separate trailer coupling such as heretofore used is unnecessary.

It should be understood that it is not desired to limit this invention to the exact details of construction or to the precise mode of operation, herein shown and described, for various modifications within the scope of the claims may occur to persons skilled in the art.

We claim:

1. A convertible boat and trailer assemblage, comprising, a pair of hingedly connected sections, one of said sections having a carrier wheel detachably vertically journaled therein, and a pivoted latch secured to one of said sections and being cooperable with the other to retain said sections in boat formation, said latch also serving as a direct draw bar when the assemblage is converted into a trailer.

2. A convertible assemblage comprising, two sections adapted to be disposed in longitudinal alinement to form a boat and to be positioned one above the other to provide a trailer compartment, the lower of said compartment sections having therein a well opening through the boat bottom, and a trailer supporting wheel unit comprising a journal member detachably fitted within said well, and a caster wheel journaled within said member and being removable therewith when the assemblage is converted into a boat, said wheel being freely and completely revolvable about the journal axis of said member to accommodate both forward and reverse advancement of the trailer compartment.

3. A convertible assemblage comprising, two sections articulably interconnected to be swung into longitudinal alinement to form a boat or to be folded over one another to provide a trailer compartment, the lower of said compartment sections having therein a downwardly open well, and a trailer supporting wheel unit comprising a journal member detachably secured within said well, and a wheel swivelled for free and complete rotation within said journal member to accommodate both forward and reverse advancement of the trailer compartment, said wheel being removable with said member when the assemblage is converted into a boat.

4. A convertible assemblage comprising, two sections articulably interconnected to be swung into longitudinal alinement to form a boat or to be folded over one another to provide a trailer compartment, the lower of said compartment sections having a journal well opening through the boat bottom, and a trailer supporting wheel having a swivel post detachably journalled in said well to provide for free and complete rotation of said wheel about the axis of said post in order to accommodate both forward and reverse advancement of the trailer compartment.

5. A convertible assemblage comprising, two sections adapted to be disposed in longitudinal alinement to form a boat and to be positioned one above the other to provide a trailer compartment, the lower of said compartment sections having a journal well opening through the boat bottom, and a trailer supporting wheel having a swivel post detachably journalled within said well so as to permit free and complete rotation of the wheel about its swivel axis.

JOSEPH PINTER, Sr.
JOSEPH PINTER, Jr.